May 21, 1935.　　　　E. C. LUNSFORD　　　　2,002,350

RAILWAY BRAKE BEAM AND BOTTOM ROD EMERGENCY SUPPORT

Filed April 10, 1933　　2 Sheets-Sheet 1

INVENTOR
Ernest C Lunsford

May 21, 1935.  E. C. LUNSFORD  2,002,350
RAILWAY BRAKE BEAM AND BOTTOM ROD EMERGENCY SUPPORT
Filed April 10, 1933  2 Sheets-Sheet 2

INVENTOR
Ernest C. Lunsford.

Patented May 21, 1935

2,002,350

UNITED STATES PATENT OFFICE 2,002,350

RAILWAY BRAKE BEAM AND BOTTOM ROD EMERGENCY SUPPORT

Errell C. Lunsford, Shreveport, La.

Application April 10, 1933, Serial No. 665,399

5 Claims. (Cl. 188—210)

This invention relates to brakes used on tank cars, locomotives and other railway equipment using brake beams and bottom rods as means to operate the brakes.

The primary object of this invention is to provide a dependable support for the brake beams and bottom rods on railway equipment.

Another object of my invention is to provide a support that may be removed or installed on equipment in yards or on gasoline loading racks where fire and electric drills are not permitted, thus eliminating the shopping of this piece of equipment.

A further object is to provide a brake beam and bottom rod emergency support that may be installed or removed in a minimum length of time.

Still another object of my invention is to provide a brake beam and bottom rod emergency support that may be installed without drilling holes in the spring plank.

Still another object is to provide a brake beam and bottom rod emergency support that may be attached to the spring plank without the use of rivets or common bolts, which are unsatisfactory.

Another object of my invention is to provide a brake beam and bottom rod support that is inexpensive, rigid, safe, simple and secure; thus eliminating unnecessary damage to braking mechanism and useless loss of life in accidents caused by derailment of railway equipment.

With these and other objects in view my invention consists in the novel construction and arrangement of parts in combination with each other, as will be explained hereinafter.

In the drawings illustrating my invention similar characters designate corresponding parts.

Figure 5 is a perspective view of a J bolt with threaded end enlarged, after washer and nut is put on.

Figure 1:
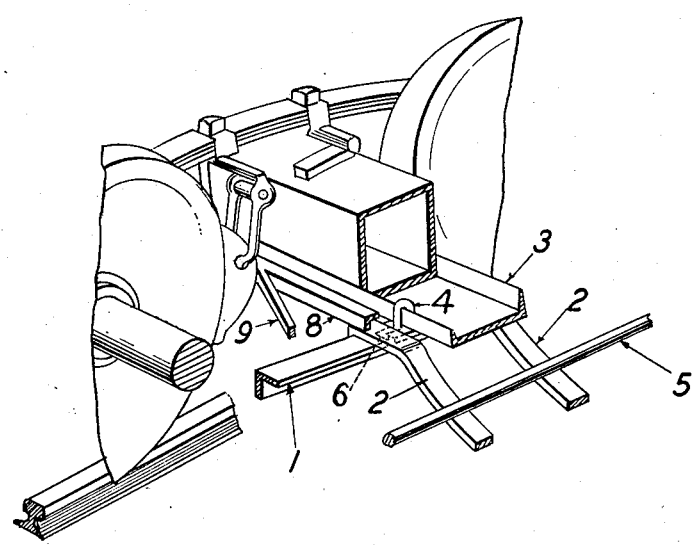
Figure 1 is a perspective view of part of a pair of trucks showing my invention installed.
Figure 3:
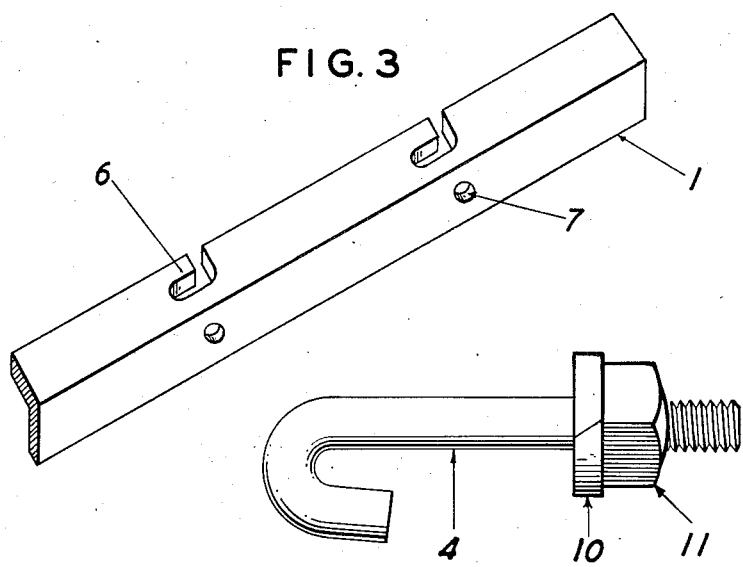
Figure 3 is a view of one support showing the slots and holes therein.
Figure 5:
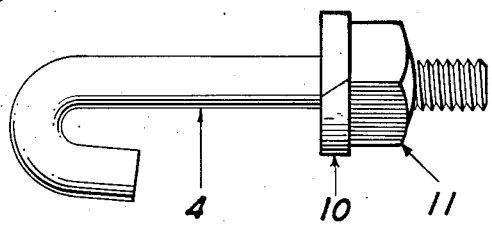
Figure 2:
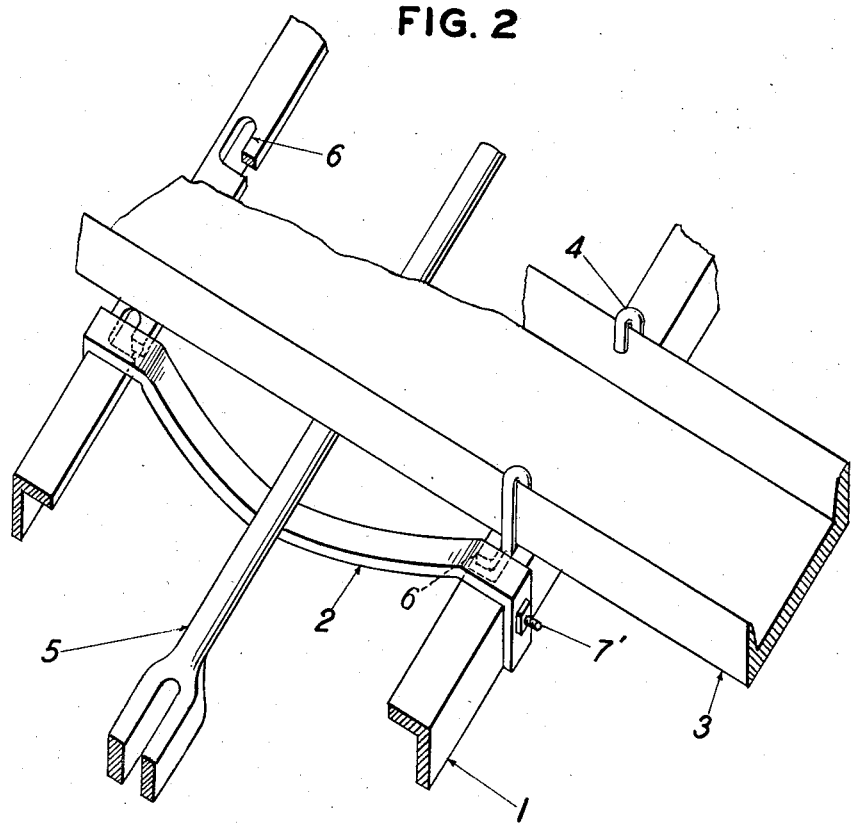
Figure 2 is a perspective view of my invention attached by means of J bolts to a spring plank.
Figure 4:
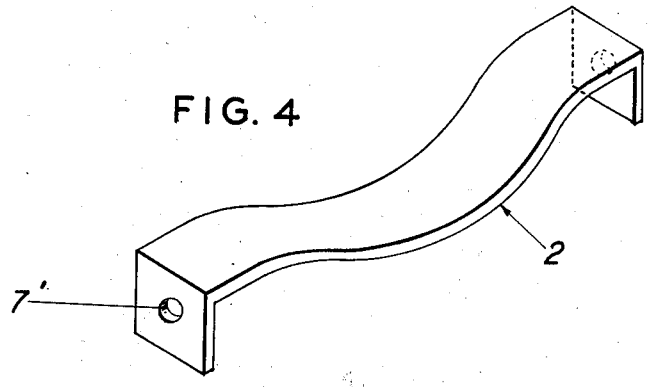
Figure 4 is a perspective view of a curved tieing strap with ends bent at right angles and having holes therein.

In the accompanying drawings the numeral 1 designates an angle bar of the desired dimensions, having two L shaped slots 6 on the top side, adapted to receive J bolts 4 suspended from spring plank 3. On the side of said angle bar 1 there are two holes 7 adapted to receive bolts.

Numeral 2 designates a curved tieing strap having each end bent at right angles and having holes 7' in each end adapted to receive bolts.

In entirety, my invention consists of two angle bars 1, having two L shaped slots on top side and two holes in the side of each bar; two curved tieing straps 2 with each end bent at right angles with holes 7' in said ends.

To install said invention I use four J bolts 4, four lock washers 10 and four nuts 11. The J bolts 4 are ample in length to allow a threaded portion to be upset after the lock washers and nuts have been placed on, thus preventing the nut from being removed.

To install my invention I now unscrew the nuts on J bolts until they contact the swelled ends of the bolts. I place the hook of the J bolt over the edge of the spring plank 3, letting nut 11 and washer 10 hang below the spring plank 3. The bar 1 is placed so slots 6 will receive J bolts 4. By sliding bar 1 lengthwise the J bolts 4 are jammed in the far end of the slots 6 and the nuts 11 are tightened. The same operation is performed with the other bar 1. Said bars 1 and 1 are positioned in such a way that ends protrude under brake beam 8 and truss rod 9. Tieing strap 2 is now placed under bottom rod 5 and over at end of angle bar 1, the holes of said tieing strap 2 are made to coincide with the holes in angle bar 1, to receive a bolt, to fasten tieing strap 2 to angle bar 1, so the edge of said tieing strap contacts J bolt 4, preventing its movement. Tieing strap 2 performs three functions inasmuch as it prevents angle bars 1 from longitudinal movement, also prevents J bolts from movement out of slots and acts as emergency support for bottom rod in event of loss of key bolts or other failures of braking mechanism.

It is apparent that after my invention is installed on a piece of railway equipment it is impossible for a brake beam or bottom rod to fall, causing damage to said piece of equipment and the ties and rails of the road bed.

Having thus described my invention, I claim:—

1. A structure of the character described having angle bars, each having two holes and two slots therein, two tieing straps adapted to be bolted on said angle bars in a manner to prevent said J bolts from sliding in the slots when attached to the spring plank of trucks of railway equipment.

2. As an article of manufacture, a brake beam and bottom rod emergency support attachable to a spring plank by means of J bolts and slotted angle bars; a curved tieing strap, extending under the bottom rod, and across the angle bars and bolted thereon in such a way that one edge of the tieing strap is contacting the J bolts to prevent slidable movement.

3. A structure of the character described comprising the combination of two slotted angle bars, two curved tieing straps and four J bolts with nuts and washers, adapted to be quickly installed or removed from the spring plank of railway equipment when used as an emergency safety support for brake beams and bottom rods.

4. A structure comprising the combination of two slotted angle bars and two curved tieing straps, adapted to be attached under the spring plank of tank car trucks by means of J bolts; each slotted angle bar extending under the brake beam and the curved tieing strap extending under the bottom rod, and across the angle bars with its edge contacting the J bolts, preventing both end and side movement thereon.

5. A structure comprising the combination of two slotted angle bars, two curved tieing straps and four J bolts; adapted to be attached under the spring plank of tank car trucks, by means of said J bolts so the ends of angle bars extend under the brake beam affording a means of supporting the brake beam in event of a mechanical failure.

ERRELL C. LUNSFORD.